Figure 3:
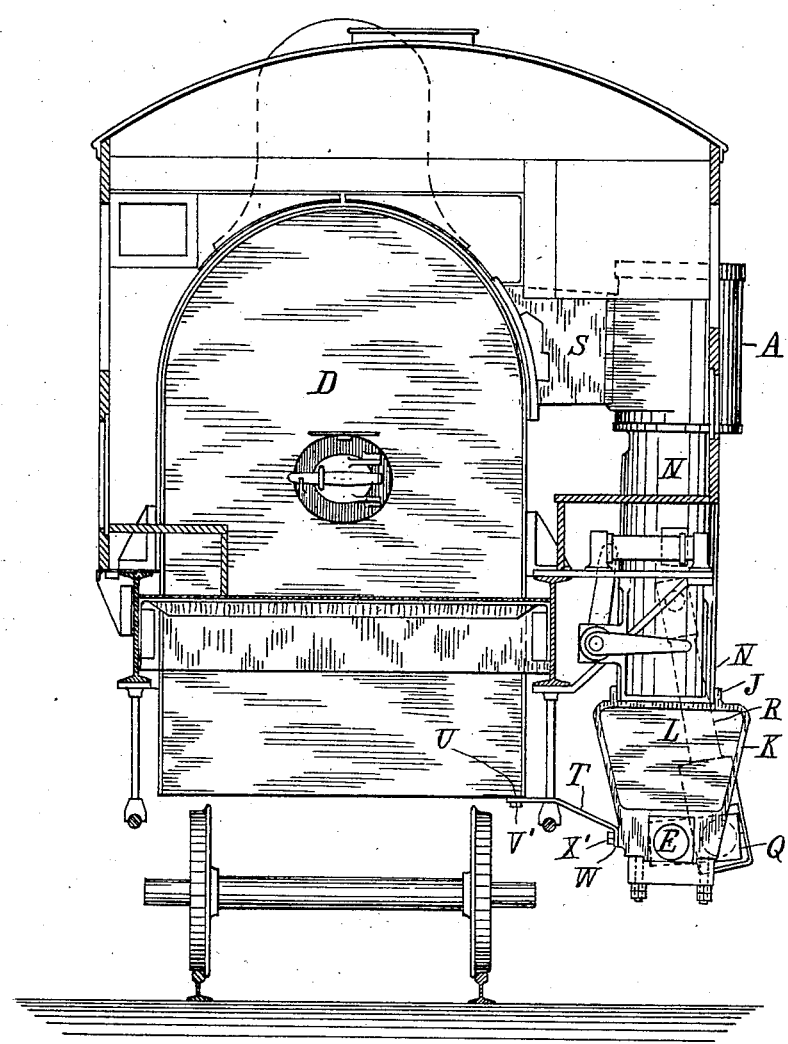

No. 879,617. PATENTED FEB. 18, 1908.
L. E. FEIGHTNER.
LOCOMOTIVE CRANK SHAFT BRACKET.
APPLICATION FILED AUG. 23, 1907.
3 SHEETS—SHEET 1.
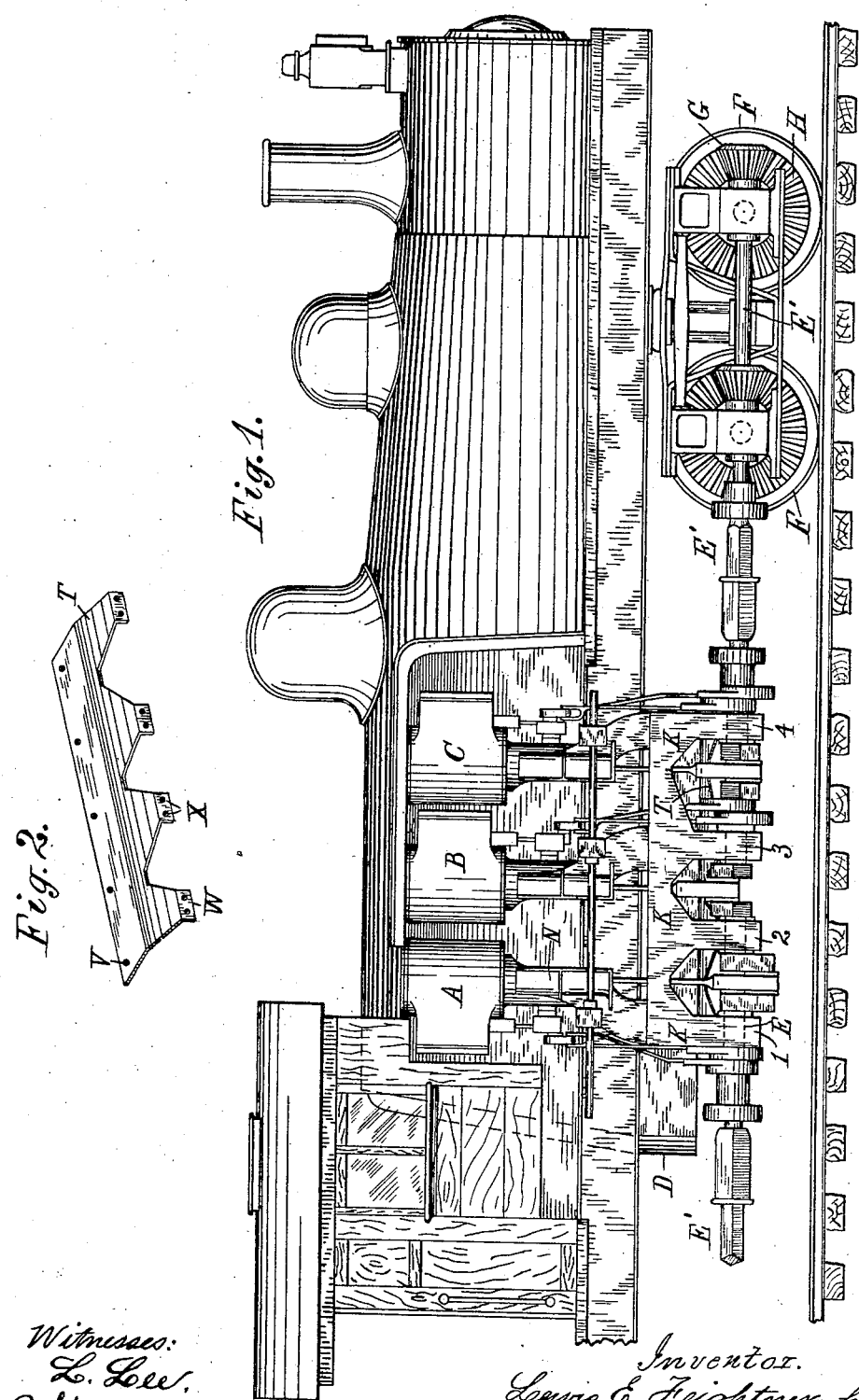
Witnesses:
L. Lee
J. W. Greenbaum
Inventor.
Lewis E. Feightner, per
Thomas S. Crane, Atty.

No. 879,617. PATENTED FEB. 18, 1908.
L. E. FEIGHTNER.
LOCOMOTIVE CRANK SHAFT BRACKET.
APPLICATION FILED AUG. 23, 1907.

3 SHEETS—SHEET 2.

No. 879,617. PATENTED FEB. 18, 1908.
L. E. FEIGHTNER.
LOCOMOTIVE CRANK SHAFT BRACKET.
APPLICATION FILED AUG. 23, 1907.

3 SHEETS—SHEET 3.

Witnesses:
L. Lee.
J. W. Greenbaum

Inventor.
Lewis E. Feightner, per
Thomas S. Crane, Atty

UNITED STATES PATENT OFFICE.

LEWIS E. FEIGHTNER, OF LIMA, OHIO, ASSIGNOR TO LIMA LOCOMOTIVE AND MACHINE COMPANY, OF LIMA, OHIO, A CORPORATION OF OHIO.

LOCOMOTIVE-CRANK-SHAFT BRACKET.

No. 879,617.	Specification of Letters Patent.	Patented Feb. 18, 1908.

Application filed August 23, 1907. Serial No. 389,791.

*To all whom it may concern:*

Be it known that I, LEWIS E. FEIGHTNER, a citizen of the United States, residing at 715 South Broadway, Lima, county of Allen, and State of Ohio, have invented certain new and useful Improvements in Locomotive-Crank-Shaft Brackets, fully described and represented in the following specification and the accompanying drawings, forming a part of the same.

This invention relates to that class of engines having a plurality of upright cylinders arranged side by side above a crank-shaft having a crank for the connecting-rod from each cylinder; and the invention includes a cylinder-frame extended downward from each of the cylinders and a junction-plate attached to the bottom ends of all the cylinder-frames, and provided with bearings to support the crank-shaft at the sides of the several cranks. Such junction-plate performs the double function of joining the lower ends of the cylinder-frames, and of carrying upon a single piece the several bearings for the crank-shaft; whereby such bearings are part of a unitary structure and are held rigidly in line with one another.

The invention is particularly applicable to that class of locomotives in which the wheels under the trucks of the locomotive (and under the tender also when desired) are converted into driving-wheels by a geared connection to a driving-shaft at the side of the locomotive, such driving-shaft being coupled to the engine crank-shaft. In such locomotives, it has been common heretofore to attach the cylinders of the engines to the sides of the firebox, and to form the cylinder-frames separately with a lower bearing at the end of each, for the bent crank-shaft. With such construction, the bearings upon the several cylinder-frames are disconnected, and have frequently been strained out of line with one another, resulting in needless friction and wear of the crank-shaft, and sometimes in the breakage of such shaft.

By the present invention, the necessary bearings for the crank-shaft may be made integral with a junction-plate, and the bearings thus held permanently in line with one another. Heretofore, in such locomotives, the lower ends of the cylinder-frames have been secured to the mud-ring or lower edge of the locomotive firebox, and as the cylinder at the upper end of the frame has been secured rigidly to the same firebox, the expansion of the firebox, when heated, has often strained the said fastenings and sometimes broken the cylinder-frames.

Figure 4:
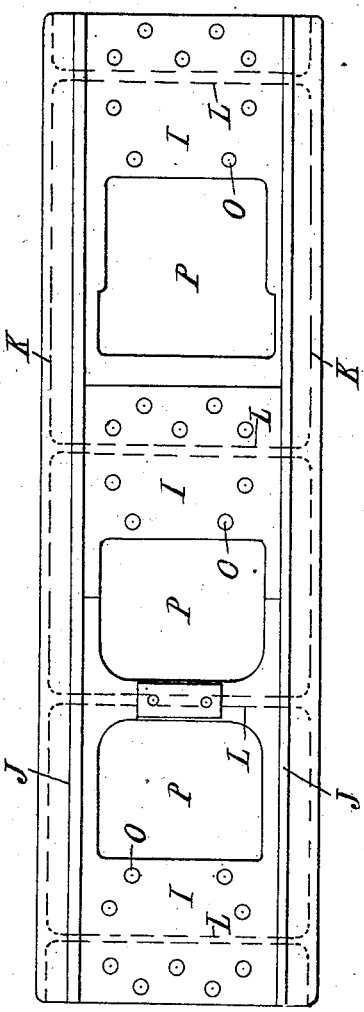
Figure 6:
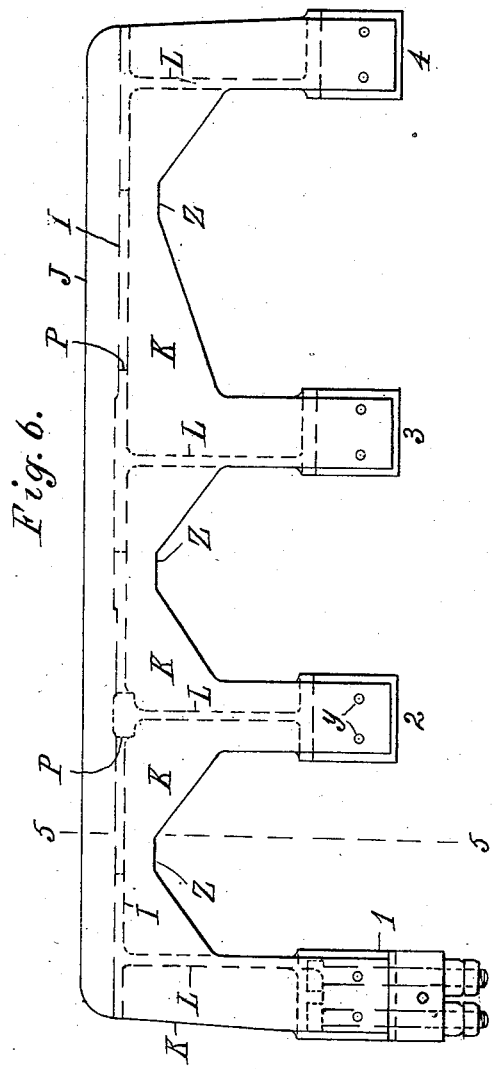
Figure 5:
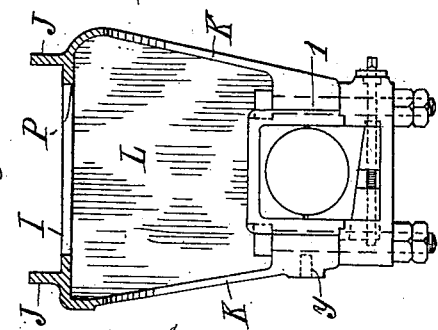

In my present construction, I employ a vertically yielding connection between the said bracket and the fire-box, so as to hold the bracket and the crank-bearings from lateral movement, while freely permitting the expansion of the fire-box, without injury to the engine fastenings. These improvements will be understood by reference to the annexed drawing, in which Figure 1 is a side elevation of a locomotive boiler with the vertical engines attached, and provided with my improvements; Fig. 2 is a perspective view of the tie-plate T; Fig. 3 represents the fire-box end of the boiler, showing the attachment of the engines thereto; Fig. 4 is a plan of the junction-plate, which is, preferably, called a crank-shaft "bracket" herein; Fig. 5 is an end view of said crank-shaft bracket, and Fig. 6 is a side view of the same.

In Fig. 1, three engine cylinders A, B and C are shown upon the side of the fire-box D, over the crank-shaft E, which is coupled to driving-shafts E' along the outer side of the driving-wheels F, and geared to them by pinions G and gear-rims H. This is the arrangement in so-called "Shay locomotives", and permits the driving of the wheels which support the tender also; but the tender, and the connection of the crank-shaft with its wheels are not shown in Fig. 1, as the invention is not dependent upon such connection. The drawing does, however, show all that part of the crank-shaft which is provided with the bent cranks for the engines, and which requires bearings to embrace the shaft at the opposite sides of each crank, to resist the strain of the engine. Four such bearings, 1, 2, 3 and 4 are shown, embracing the crank-shaft at the opposite sides of the three cranks; and the primary feature of my invention consists in the junction-plate I cast in one piece with the supports for the bearings, and a cylinder-frame connecting each cylinder with such junction-plate. The bearing supports themselves are stiffened, and their union with the plate I strengthened by side-plates K and transverse webs L, which serve to strongly brace the bearings and their union with the junction-plate.

The construction of this bracket forms a sort of "box-girder" carrying the crank-shaft bearings, and holding them most rigidly in line with one another, so that the shaft is wholly protected from lateral or vertical distortion. The connection of this bracket with the engine cylinders is effected by forming their cylinder-frames N with feet adapted to fit the top of the plate M, and bolting such feet securely to the plate, as indicated by the bolt-holes O in Fig. 4.

The junction-plate I is preferably formed with a flat top to receive the feet of the cylinder-frames, and such top is necessarily formed with perforations P for the passage of the engine connecting-rods, as shown in Fig. 4; the bearings also extending far enough below the plate I for the cranks to swing, as is indicated in Fig. 5, also by the representation of the crank Q and a connecting-rod R in dotted lines, in Fig. 3.

Fig. 3 shows the ordinary means of securing the cylinders to the fire-box, by a so-called steam-bracket S, and this figure also shows the means of holding the crank-bearings from lateral movement while permitting the free expansion of the fire-box without straining the engine connection. This is effected by extending a transverse tie-plate T from the bearings to the fire-box (or mud-ring at its bottom) of a sufficiently yielding character to bend vertically when the fire-box expands, and thus obtaining a lateral brace for the bearings without any possibility of straining the cylinder and crank-bearing connections.

The tie-plate is shown in Fig. 3 formed of a flat piece of boiler-plate attached at its opposite edges respectively to the mud-ring U and the bearings 1, 2, 3, 4, and fitted to bend vertically in the necessary degree, while holding the bearing laterally in the required position. The plate T has holes V for the bolts V' which secure it to the mud-ring, as shown in Fig. 2, and is notched at one edge to clear the cranks Q and formed with feet W having holes X for bolts X' inserted in holes $y$ which are indicated in the rear sides of the bearings 1, 2, 3, 4, in Fig. 6.

Fig. 1 shows clearly the support afforded to the crank-shaft by the united bearings 1, 2, 3 and 4, upon the bracket; and the importance of such a united support is particularly emphasized in the "Shay engine," as the crank-shaft is, in this class of engine, made separate from the driving-shafts which carry the pinions G, to permit the free flexure of the driving-shaft when the locomotive is passing over curves. Universal couplings are shown connecting the crank-shaft with the line-shafts which carry the pinions; such latter shafts being supported in bearings upon the locomotive and tender trucks, so as to move with the same. The portion having the bent cranks cannot, therefore, be reinforced or supported in any way by the other parts, and is thus wholly dependent upon the crank-shaft bearings for keeping the cranks in line with one another and in a fixed relation to the engine cylinders. The solid bracket furnishes exactly the connection that is needed between the bearings themselves, and between the bearings and the engine-cylinders, and its efficiency arises from its performing such a double function. It is evidently immaterial whether the junction plate which unites the bearings, and joins them to the cylinders, be shaped precisely as shown in the drawing, as it is only essential that it should perform the functions defined herein, and such functions could evidently be performed by mounting the bearings upon the junction-plate in any rigid manner without casting them thereon.

In Fig. 1, three cylinders A, B and C are shown with a bearing-bracket having four crank-shaft bearings thereon to support the opposite sides of the three cranks, but the invention is applicable to more or fewer cylinders, as the junction-plate of the bracket serves equally in any case to unite the cylinder-frames, and to hold the crank-bearings in line with one another whatever the number of cranks and cylinders employed.

What I claim and desire to secure by Letters Patent is:

1. In a locomotive having upright engines, the combination, with a plurality of cylinders arranged side by side above the same crank-shaft and the crank-shaft having a crank for each cylinder, of cylinder-frames extended downward one from each of the cylinders, and a junction-plate secured transversely to the cylinder-frames and provided with crank-shaft bearings embracing the crank-shaft at the sides of the several cranks.

2. In a locomotive having upright engines, the combination, with a plurality of cylinders arranged side by side above the same crank-shaft and the crank-shaft having a crank for each cylinder, of cylinder-frames extended downward one from each of the cylinders, and a junction-plate secured transversely to the cylinder-frames and perforated for the passage of the engine connecting-rods, and having crank-shaft bearings embracing the crank-shaft at the opposite sides of each of the cranks.

3. In a locomotive having upright engines, the crank-shaft bracket having a flat perforated plate for the passage of the connecting-rods, bearings projected downwardly therefrom for a crank-shaft, longitudinal side-plates uniting the bearings with the top-plate and notched or arched between the bearings to clear the cranks, and transverse webs connecting the top-plate and side-plates, forming a box-girder with the bearings thereon, and adapted to unite all the cylinder-frames when bolted thereto.

4. In a locomotive having a plurality of upright cylinders with upright cylinder-frames, the combination, with said frames, of a crank-shaft bracket having a flat junction-plate secured to the bottoms of the said frames and having perforations for the passage of the engine connecting-rods, bearings upon the lower side of the plate with side-plates connecting the bearings and top-plate, and a crank-shaft fitted to the bearings and having cranks corresponding to the several cylinders.

5. In a locomotive having upright engines, the combination, with the fire-box having a mud-ring, of a plurality of upright cylinders secured to the fire-box with frames extended downward therefrom, a crank-shaft at the side of the fire-box, and a crank-shaft bracket connecting the bottoms of the cylinder-frames, and having a yielding connection to the mud-ring, to brace the bearings laterally and permit the expansion of the fire-box without strain upon the cylinder-frames.

6. In a locomotive having a plurality of upright cylinders attached to the side of the fire-box and the fire-box having a mud-ring at the bottom, the combination, with cylinder-frames extended downward from the cylinders, of a crank-shaft bracket connected to the said frames, bearings projected downward upon the bracket with a crank-shaft therein, and a yielding plate connecting the bearings to the mud-ring, whereby the bearings are braced laterally and injury to the engine-frames by the fire-box expansion is avoided.

7. In a locomotive, the combination, with the fire-box, of a plurality of upright engines secured rigidly to the fire-box at the upper end, and having a yielding connection to the fire-box at the lower end, as and for the purpose set forth.

In testimony whereof I have hereunto set my hand in the presence of two subscribing witnesses.

LEWIS E. FEIGHTNER.

Witnesses:
JOHN H. PHILLIPS,
GEORGE L. WALL.